United States Patent [19]
Allen

[11] 3,965,605
[45] June 29, 1976

[54] FISH HOOK TIER

[76] Inventor: Arthur A. Allen, 1207 Martin Drive, Colorado Springs, Colo. 80915

[22] Filed: Aug. 28, 1974

[21] Appl. No.: 501,206

[52] U.S. Cl. .................................. 43/1; 81/3.44; 223/99; 269/6
[51] Int. Cl.² ..................... A01K 97/06; B25B 1/00
[58] Field of Search ............ 43/1, 4; 223/99; 269/2, 269/6, 278, 254 R; 81/3.34, 3.35, 3.36, 3.4, 3.44, 3.48

[56] References Cited
UNITED STATES PATENTS
3,588,078   6/1971   Van De Sande ..................... 43/1

FOREIGN PATENTS OR APPLICATIONS
816,339   10/1951   Germany ............................. 223/99

*Primary Examiner*—Russell R. Kinsey
*Assistant Examiner*—Peter K. Skiff
*Attorney, Agent, or Firm*—W. Britton Moore

[57] ABSTRACT

A fishhook tieing device including a handle, a spring clamp and a threading device. The spring clamp is attached to one end of the handle for grasping a hook. The threading device includes a spring wire loop end which is readily compressed to be pushed through the eye of the hook and thereafter expands to its original size whereby a fishing line end may be easily extended through the loop. Extraction of the loop end then pulls the line through the hook eye whereby the line may then be tied to the hook.

6 Claims, 4 Drawing Figures

FISH HOOK TIER

This invention relates to fishhook tyers and more particularly to apparatus for holding a fishhook and simplifying insertion of a line through the eye of a small hook.

While fishing it quite often becomes necessary to tie a replacement hook onto a leader or fishing line. This simple task can be extremely difficult if the hands of a person are partially numbed by cold weather conditions, wind is blowing the line around, the user has difficulty in maintaining a steady position, and/or failing visibility makes it difficult to accurately position and insert a line or leader in the eye of a small hook. When the line is being attached to a dry fly, additional effort must also be devoted to holding the fine hairs or feathers of the fly apart from the line as it is inserted in the small eye.

The prior art has attempted to alleviate these problems by providing holding devices for small hooks. Some of these devices include means for restraining the fine hairs or feathers of a fly while attaching the line. Other devices provide a means for forming various types of knots for holding the hook to the line. However, none of the prior art devices solve the aforesaid problems by providing a means guiding a line or leader through the eye of a small hook.

It is an object of the invention to provide an improved hook tying device of simple, economical and durable design.

It is another object to provide an improved hook tying device which includes means for firmly holding a hook during a tying process.

It is a further object to provide an improved hook tying device which includes means for threading a line through the eye of a small hook under adverse conditions.

Accordingly, the present invention provides a hook tying device having an elongated handle to one end of which is attached a spring clamp which is used to hold a small hook. The opposite end of the handle has an opening extending into the handle, which opening is adapted to receive a hook threading device. The opening is sized to provide frictional engagement with the threading device to thereby maintain the threading in a stored position when not being used. A cap is provided to cover the spring clamp when the tying device is stored.

The foregoing and other objects, features and advantages of the invention will be apparent from the following description of the invention as illustrated in the accompanying drawings wherein.

Figure 1:
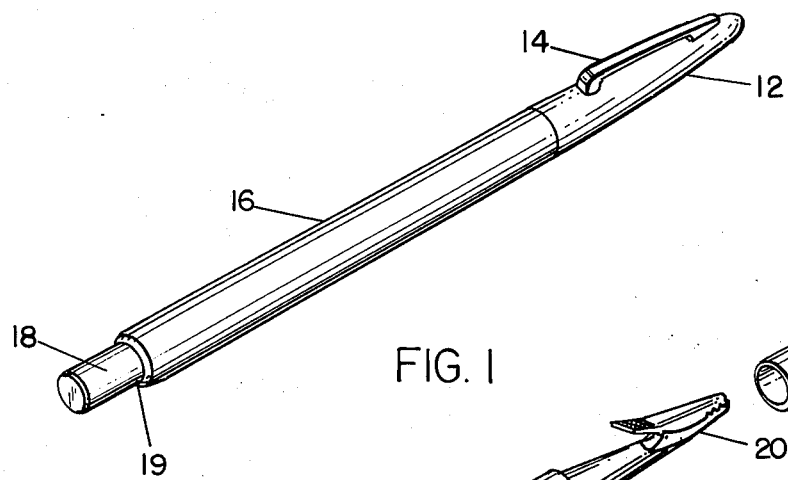
FIG. 1 is a perspective view showing the fish hook tyer of the present invention in assembled form.

Referring now to FIG. 1, the hook tying device of the present invention is shown in assembled form. The tying device includes a generally cylindrical cap 12 having a clip 14 to allow the tying device to be held in a shirt pocket or the like when not in use, since the tying device may readily be constructed in a size approximating that of a fountain pen. The tying device further includes an elongated generally cylindrical handle or body portion 16 and a hook threading device 18, which device 18 is stored in an opening 19 in the end of handle 16.

Figure 2:
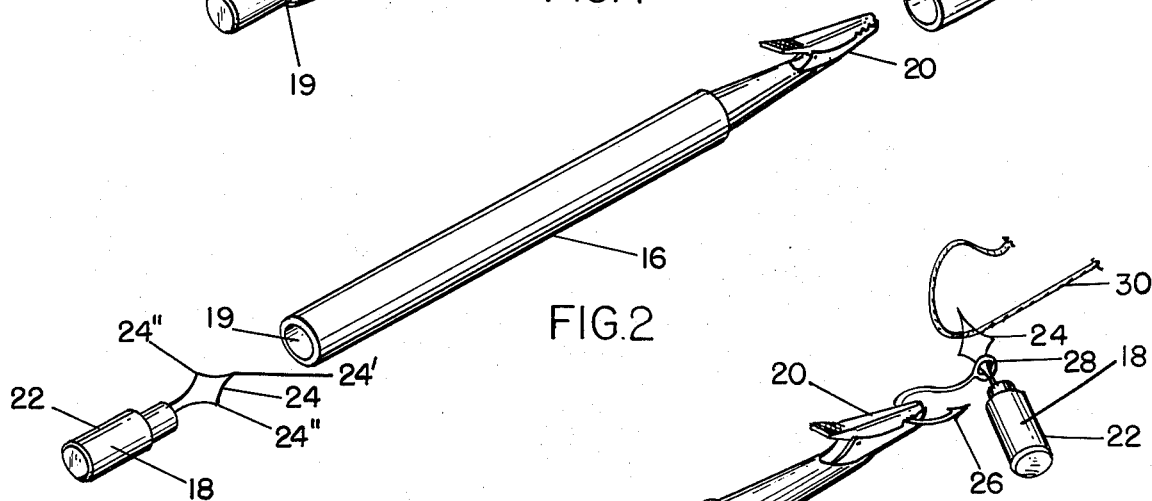
FIG. 2 is an exploded view of the fish hook tyer of FIG. 1.

Referring now to FIG. 2, there is shown an exploded view of the tying device from which it can be seen that the handle 16 has attached thereto a spring clamp 20 shown therein as a clamp of the type commonly referred to as an alligator clip. The clamp is firmly attached to handle 16 by an epoxy adhesive, for example. Other means for attaching the clamp will be obvious to those skilled in the art. The ends of handle 16 are preferably tapered to allow cap 12 to be placed in frictional engagement with the handle.

The threading device 18 includes a generally cylindrical handle portion 22 and a loop end 24 formed of fine gauge metal or plastic wire so as to be flexible, although any material capable of being formed in fine gauge and retaining elastic properties could be used. Loop end 24 may be constructed, for example, of a weedless hook with the shank cut off, and may be attached to handle portion 22 by any of several means known in the art, such as, by an adhesive, not shown. The loop end 24 assumes a generally arrow shaped configuration with a pointed end 24' and outwardly angled sides 24''.

Figure 3:
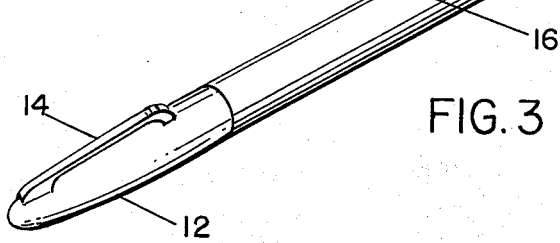
FIG. 3 is a perspective view illustrating the use of the fish hook tyer of FIG. 1.
Figure 4:
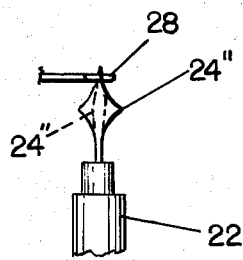
FIG. 4 is a view showing the loop end of the threader as it extends through the hook eye.

Referring to FIG. 3, the operation of the hook tying device will now be described. A hook 26 is arranged such that it can be grasped by expanding and then releasing clamp 20 with the eye 28 of the hook away from the clamp 20. With the hook 26 now firmly held by clamp 20, threading device 18 is then grasped by handle portion 22 and the pointed end 24' of loop end 24 is pushed through eye 28. Being formed of an elastic material, the oppositely and outwardly angled sides 24'' of loop end 24 will collapse inwardly to allow passage through eye 28. Once through eye 28 the sides of loop end 24 will spring outwardly thereby retaining threading device 18 on hook 26 and providing an opening much larger than the eye 28 through which opening a line 30 may be passed.

Once a length of line 30 has been passed through loop end 24, the latter will be pulled back through eye 28 simultaneously carrying line 30 therethrough. Threading device 18 is then removed and the end of line 30 is grasped and folded back alongside of the main portion of the line.

Although different types of knots may now be tied, a simple fisherman's knot will now be described. While still holding the loose end of line 30 which is passed through eye 28, also grasp with the same hand the main portion of line 30. With the opposite hand rotate handle 16 three times to cause the loose end of line 30 to loop around the main portion thereof. Next, while maintaining a grip on handle 16, take the loose end of line 30 and pass it over and down through the loop formed by line 30 which is closest to eye 28 of hook 26. By pulling the line tightly a knot is formed and thereby secures the knot to the line.

Clamp 20 is then released to unsnap hook 26, cap 12 is placed back over the clamp end of handle 16, and threading device 18 is reinserted in its storage position in handle 16.

While the invention has been described with reference to a particular embodiment, it will be understood by those skilled in the art that the foregoing and other changes in form and in detail may be made without departing from the spirit and scope of the invention.

What is claimed as new and desired to be secured by Letters Patent of the United States is:

1. A hook tying device comprising:

An elongated handle including a tubular recess in a first end

A spring clamp including gripping jaws attached to a second end of said handle and having means for pivoting one of said jaws to receive and grasp the barbed end of a fishing hook A removable threading device having a reduced tubular end sleeved in said tubular recess, said threading device having a handle portion and a loop end portion and wherein said loop end is formed of an elastic material such that said loop end may be compressed for passing through an eye of said fishing hook for passing a line through said loop end, after which the line is withdrawn through the eye by said loop end for subsequent knotting, and a cylindrical cap removably mounted on said second end for enclosing said clamp and having mounting clip means secured exteriorly thereof.

2. A hook tying device according to claim 1 wherein said loop end portion is pointed and flexible.

3. A hook tying device according to claim 2 wherein said flexible loop end portion is generally arrow shaped.

4. A hook tying device according to claim 3 wherein said arrow shaped flexible loop end portion is of thin gauge wire.

5. A hook tying device according to claim 1 wherein said threading device handle is generally cylindrical and is sleeved within the first recess of said elongated handle.

6. A hook tying device according to claim 1 wherein said spring clamp is an alligator clamp.

* * * * *